Sept. 4, 1945.　　F. W. SCHWINN　　2,384,139
FOLDING CRANK FOR BICYCLES
Filed Aug. 14, 1943　　2 Sheets-Sheet 1
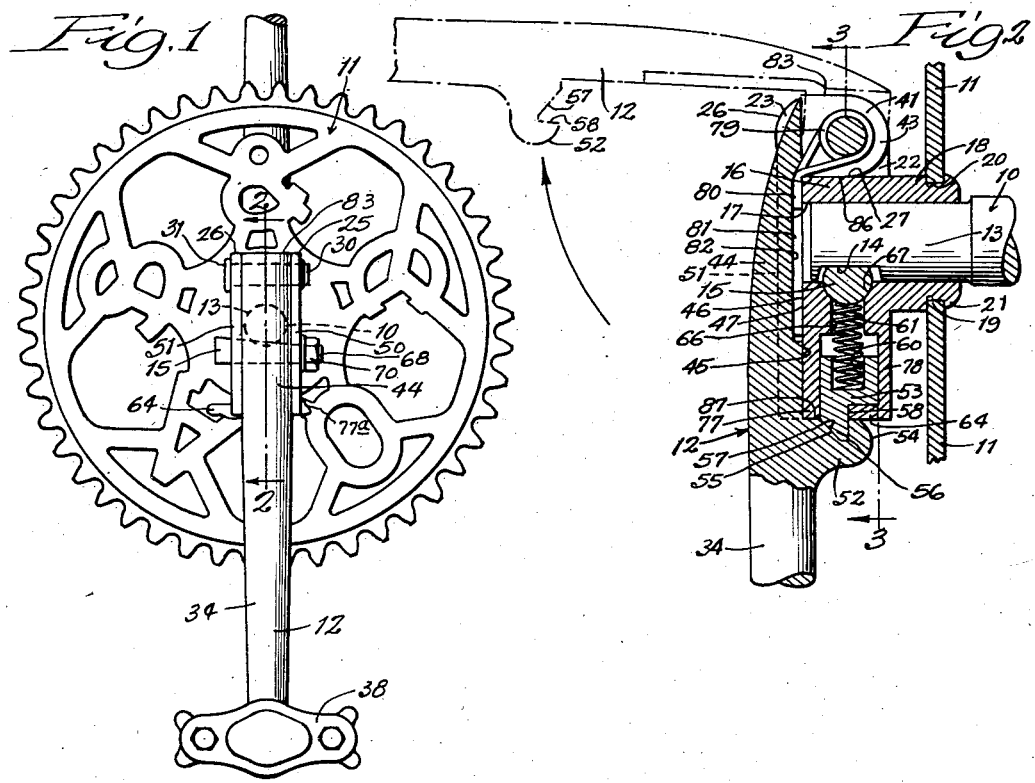
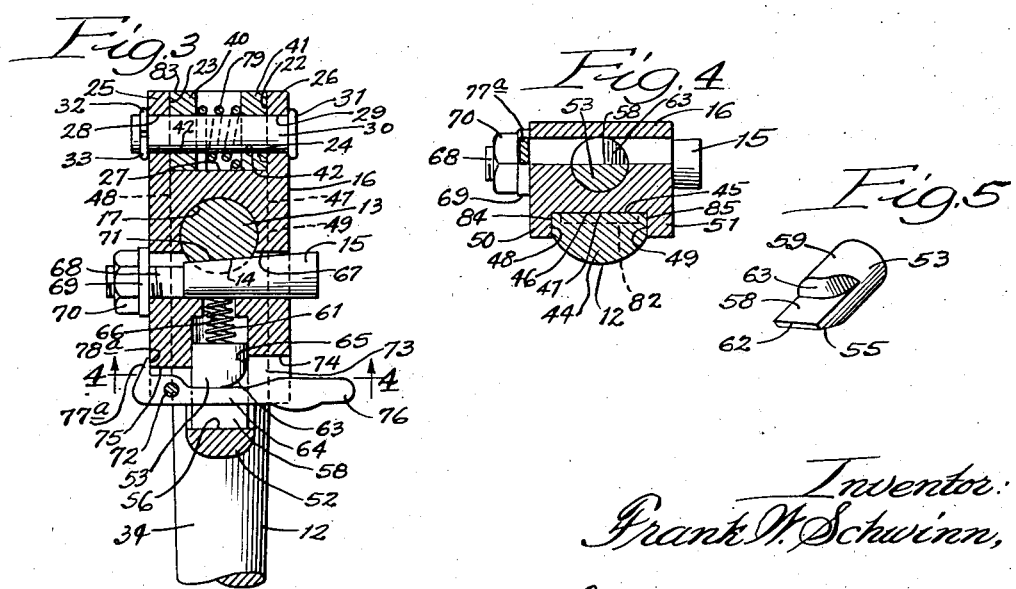
Inventor:
Frank W. Schwinn,
By McCabe, Wend and Dickinson
Attorneys.

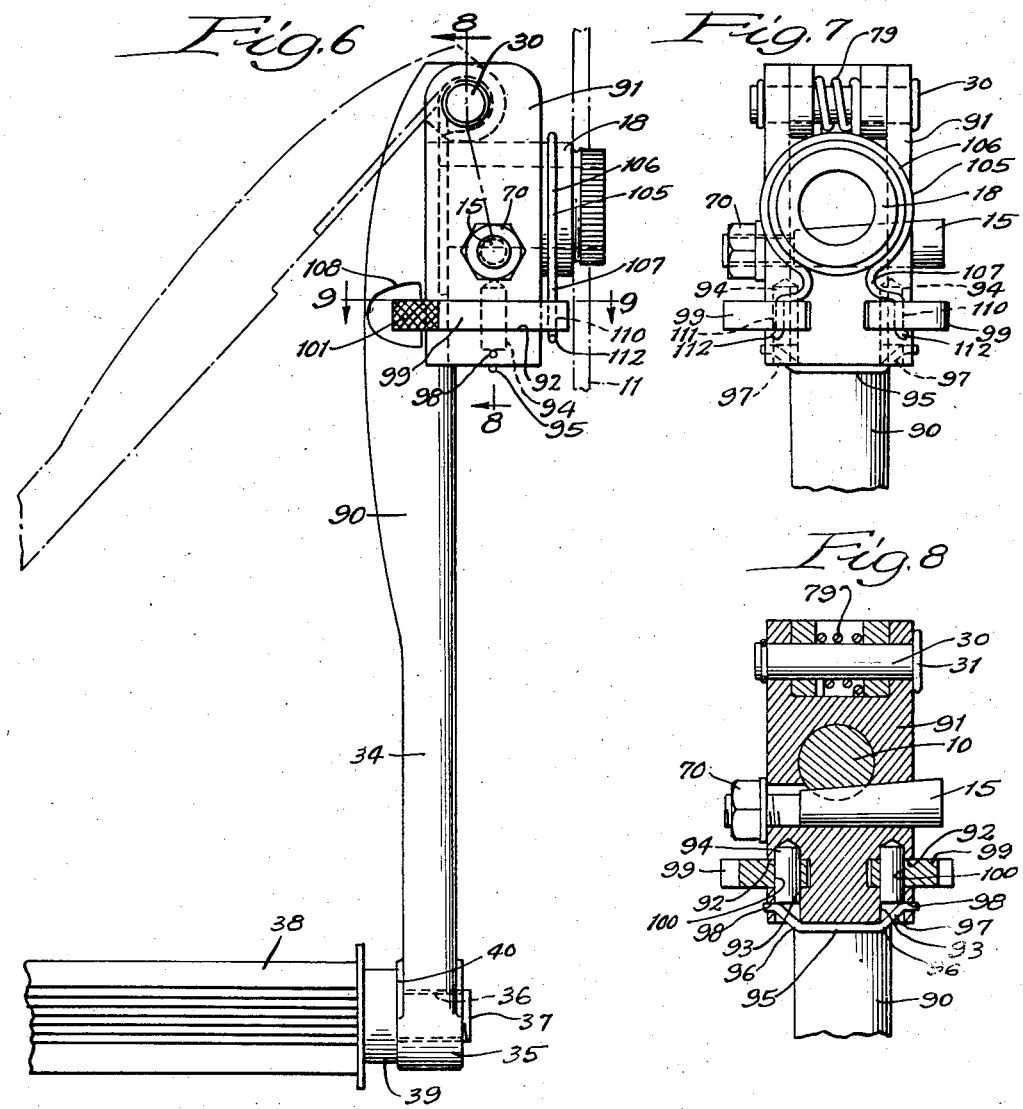

Patented Sept. 4, 1945

2,384,139

UNITED STATES PATENT OFFICE 2,384,139

FOLDING CRANK FOR BICYCLES

Frank W. Schwinn, Chicago, Ill.

Application August 14, 1943, Serial No. 498,684

9 Claims. (Cl. 74—594.1)

The present invention relates to folding cranks for bicycles, and is preferably employed in bicycles of the type having other folding features covered by my co-pending applications, but the folding cranks of my invention may be used in all types of bicycles, as the outwardly projecting parts of the ordinary cranks of the prior art are frequently in the way whenever it is desired to transport any bicycle. Under such conditions any bicycle of the prior art may be improved by utilizing the present folding cranks.

One of the objects of the invention is the provision of an improved folding crank construction for bicycles which is particularly desirable for special use, such as in military operations. In such operations, or whenever it is desired to carry or transport a bicycle, it is advantageous to have the bicycle so constructed that it can be folded up in such manner as to require the smallest possible amount of space.

The cranks of the prior art with which I am familiar occupy a considerable amount of space, and prevent a bicycle from being laid down upon a flat surface without having the frame and other parts lifted a considerable distance above the plane supporting surface, on account of the downwardly projecting parts of the crank, and the upwardly projecting parts of the other crank, which are also a hindrance to its packing and transportation.

Another object of the invention is the provision of an improved folding crank construction, the mechanism of which is provided with spring means for moving the crank into the folded position, and with latching means for holding the crank in its operative position so that it is only necessary to release the latch to permit the cranks constructed according to my invention to move into their folded positions.

Another object of the invention is the provision of an improved folding crank which is pivotally mounted for movement relative to the crank shaft, and in which the mechanism is so constructed that substantially all strain on the said pivotal support is removed and the crank is directly connected to the crank shaft by engaging shoulders on the crank and shaft on which the forces caused by torque may be exerted without any chance of damage to the mechanism.

Another object of the invention is the provision of an improved folding crank construction which is sturdy, capable of economical manufacture so that it may be sold at a reasonable cost, which is adapted to be firmly secured in its operative position, and which is adapted to be used for a long period of time without necessity for repair or replacement of its parts.

Other objects and advantages of the invention will be apparent from the following description and the accompanying drawings, in which similar characters of reference indicate similar parts throughout the several views.

Referring to the drawings, of which there are two sheets,

Fig. 1 is a fragmentary elevational view of the sprocket, crank, and crank shaft, illustrating a construction embodying the invention;

Fig. 2 is a fragmentary sectional view, taken on the plane of the line 2—2 of Fig. 1, looking in the direction of the arrows;

Fig. 3 is a fragmentary sectional view, taken on the plane of the line 3—3 of Fig. 2, looking in the direction of the arrows;

Fig. 4 is a fragmentary sectional view, taken on the plane of the line 4—4 of Fig. 3, looking in the direction of the arrows;

Fig. 5 is a view in perspective of the latching plunger which holds the crank in its operative position;

Fig. 6 is a fragmentary side elevational view of another modified form of folding crank construction;

Fig. 7 is a fragmentary end elevational view of the modification of Fig. 6, with the crank in its operative position;

Fig. 8 is a fragmentary sectional view, taken on the plane of the line 8—8 of Fig. 6;

Fig. 9 is a sectional view, taken on the plane of the line 9—9 of Fig. 6, looking in the direction of the arrows; and showing the latches for holding the crank in its operating position.

The folding cranks embodying the present invention preferably have two positions, and the operative position referred to is that in which the cranks are ready to be used for driving the wheel of the bicycle. The folded position, as distinguished from the operative position, is the one in which the cranks have been moved out of their usual operative position into a position where they will occupy less space because the pedals extend toward each other and are located inside the plane of the frame.

Referring to Fig. 1, 10 indicates the crank shaft of a bicycle which is provided with the usual driving sprocket 11, and which is shown in connection with my improved folding crank 12.

The crank shaft 10 is usually provided with a reduced cylindrical portion 13 for receiving the hub of the crank, and the reduced cylindrical portion 10 may be provided with a key-way having a flat surface 14 for receiving the tapered pin 15, which keys the crank to the shaft 10.

The present folding crank preferably includes a block 16, which may be substantially rectangular in end elevation (Fig. 3) and which is provided with a through bore 17 for receiving the reduced cylindrical end 13 of the crank 10.

The block 16 may also have an inwardly projecting tubular extension 18, which is provided with a reduced cylindrical portion 19 for receiving the complementary bore 20 in the sprocket 11. The end of this reduced cylindrical portion 19 is spun or riveted over at 21 to secure the sprocket 11 to the cylindrical extension 18 of the hub block 16. Thus, in Fig. 2, the reduced cylindrical portion 19 in its finished form has a groove for receiving the sprocket 11 that is fixedly secured to the block 16.

The block 16 may be provided at its upper end (Fig. 2) with a transverse groove 22 of substantially rectangular shape in cross section, the groove being defined by the plane surfaces 23, 24 on the side flanges 25, 26 and by a lower plane surface 27. The spaced side flanges 25, 26 are provided with the aligned cylindrical bores 28, 29 for receiving the pivot pin 30, upon which the crank 12 is to be pivoted.

This pivot pin may be provided with a relatively small and flat head 31, and at its opposite end with a partially cylindrical groove 32 for receiving the spring wire 33 that acts as a thrust member to hold the pivot pin 30 against removal from its bores 28, 29.

The crank 12 comprises an elongated metal member, the shank 34 of which may be oval in shape to increase the strength of this member against bending strains in the direction of the forces exerted when pedaling takes place. At the lower end of the crank 12 it is provided with the usual head 35, partially cylindrical in shape, and having a threaded bore 36 for receiving the threaded end 37 of the shaft, which rotatably supports the pedal 38.

The pedal shaft 39 has an annular shoulder 40, limiting its position in the threaded bore 36; and the shaft is threaded home against the annular shoulder 40, to secure it fixedly to the crank.

At its upper end the crank 12 is provided with a pair of inwardly extending pivot flanges 40, 41, which fit between the flanges 25, 26 on the block, and are provided with cylindrical apertures 42 for receiving the pivot member 30. The flanges 40, 41 are provided with inner surfaces 43 that are cylindrically curved so that they will not interfere with the other parts of the block when the crank pivots upward from the full line position of Fig. 2 to the dotted line position.

The block-engaging portion 44 of the crank 12 has its inner side 45 provided with a substantially plane surface for engaging the plane surface 46 that forms the base of a groove 47 in the outside of the block 16.

The groove 47 is bounded by the plane surface 46, forming its base, and the two plane surfaces 48, 49 on the flanges 50, 51. The length of the plane surface 45 on the crank 12 is substantially equal to the length of the groove 47 in the block 16 so that the crank 12 may be provided with an inwardly extending lug 52 adapted to serve as a keeper for the latching plunger 53.

The lug 52 is provided with a curved outer surface 54, serving as a camming surface for engaging the beveled camming surface 55 on the latching plunger 53. It is also provided with a groove 56, which may be substantially complementary to the end formation of the latching plunger 53, which it is intended to receive. Thus, the groove 56 has a sloping side surface 57 and an abrupt retaining surface 58.

The latching plunger 53 comprises a short, substantially cylindrical metal member, the cylindrical surface of which is indicated by the numeral 59. At its upper end (Fig. 2) it is provided with a centrally located axial bore 60 for seating and receiving one end of the helical coil spring 61. At its lower end the plunger 53 is provided with the plane retaining surface 58 and with the beveled surface 55. It preferably has a small plane end surface 62, since it is not desirable, from the point of view of wear, to make the end of the plunger sharp. At the point where the cylindrical surface 59 ends and the plane surface 58 begins, the plunger 53 is provided with a curved thrust surface 63 for engaging the locking lever 64. This surface 63 is curved to permit the locking lever 64 to exert its thrust substantially centrally so that the plunger 53 will not bind in its guide.

The plunger 53 is slidably mounted in a cylindrical bore 65, which serves as a guide for the plunger, and the bore 65 is of sufficient length to permit the plunger to be wholly retracted from the groove 56 in the inward lug 52 of the crank 12.

The bore 65 preferably communicates with a smaller counterbore 66, which may communicate with the transverse bore 67 in the block 16 for receiving the tapered pin 15. The transverse bore 67 communicates with the crank shaft bore so that the pin 15 may engage the crank 10. The compression spring 61 may thus engage the pin 15, against which it reacts the plunger 53 downward in Fig. 2.

It should, of course, be understood that the descriptive terms "upward" and "downward" are used with reference to the position of Fig. 2 on a depending crank, and these would be reversed on the other crank, which extends upward.

The tapered key pin 15 may be provided with a threaded shank 68, having a spring washer 69 and nut 70, so that the key 15 may be drawn into the bore 67. The taper on the pin 15 may be in the form of a flat surface 71 on its upper side in Fig. 3, and the groove 14 in the shaft end 13 may be of complementary shape, with a flat surface 14, one exception being that the groove is of ample width.

Thus the block 16 may be tightly locked or secured on the shaft 10.

Providing the plunger 53 with a flat end portion 58 and curved shoulder 63 also provides space for the pivoted actuating lever 64, which is pivotally mounted on the lower end of the block 16 by means of a pin 72.

This actuating lever 64 extends substantially parallel to the plane of the sprocket 11, and at the lower end of the block 16 it is provided with a transverse groove 73, which may be deeper at 74 on the right (Fig. 3) than it is at 75 on the left side of the plunger 53.

The reason for this is to give the actuating lever 64 room for a maximum upward movement at its handle end 76. The lever 64 is pivoted on the pin 72, which is carried by the two flanges 77, 78, which define the groove 73, and the pin 72 may have a tight frictional fit in its aligned bores in the flanges 77, 78. At its left end the actuating lever 64 has an upwardly extending lug 77ª provided with a plane surface 78ª for engaging the side of the plunger 16 when the crank is in its operative position of Fig. 2. The surface 78 and the side of the block serve as stop surfaces for limiting the clockwise pivotal movement of the actuating lever 64 in Fig. 3, and for preventing the plunger from being forced out of its guide 65 when the plunger is not engaging the crank.

The pivot pin 30 at the upper end of the crank is preferably provided with a coil spring 79, which may have a number of its turns wound about the pivot pin 30. This coil spring is provided with a holding end 80, comprising an outwardly projecting portion, which extends over to the outside of the block 16, where it may hook over the outside plane surface 46 that forms the base of the groove 47.

The other end of the spring 79 has an elongated portion 81, which extends over toward the front of the block 16 and downwardly, parallel to the portion 80. In order to provide space for the spring portions 80, 81, the inside of the crank at this point, that is, the plane surface 45, is provided with a relatively shallow recess 82. This recess may be of substantially rectangular shape in elevation, providing ample space for both ends of the spring. The spring is so tensioned that the end portion 80 reacts in a counterclockwise direction (Fig. 2) against the block 16, while the longer portion 81 acts in a clockwise direction against the crank 12, urging the crank upward to the dotted line position in Fig. 2.

This dotted line position, however, does not represent any position in which the crank stays, but merely one of the positions which it assumes in its folding movement. The spring has a range of movement, and is of sufficient strength to move the crank upward to a substantially vertical position when the crank is in its folded position. The clockwise pivotal movement of the crank 12 is stopped when the upper plane surface 83 on the crank moves over into engagement with the top of the tubular extension 18 on the block. Thus, surface 83 and tubular extension 18 act as a stop for limiting the pivotal movement of the crank under the influence of spring 79.

The operation of the folding crank is as follows: When the crank is in its folded position, it is held in such position by the spring 79, which urges the crank upward into a position extending substantially parallel to the sprocket 11, with the surface 83 engaging the tubular extension 18.

In this position, the pedals, which ordinarily would project outward on each side of the bicycle, now extend inward toward each other and occupy no greater space than the length of the crank shaft itself. The crank shaft may be rotated until one crank extends forwardly and the other rearwardly, or there may be a number of different positions into which the cranks may be placed for the most convenient folding, so that the folding of the cranks will not interfere with the frame or action of other folding mechanism which is used with this folding crank.

When it is desired to use the bicycle, it is only necessary for the operator to grasp each pedal and pivot the crank on its pivot pin 30 against the force of the spring 79 until the camming end 54 of the crank extension 52 strikes the beveled end 55 of the plunger 53, urging the plunger upward; and then, as it passes the plunger, the plunger moves down into the groove 56 to hold the crank in the position of Fig. 2.

When the crank 12 is in its operative position, its flat side surfaces 84, 85 engage the walls 48, 49 of the groove 47 in the block 16 and enable the crank to rotate the block without placing any strain on the pivotal support for the crank. Furthermore, the crank has its upper flanges 40, 41 provided with flat lower surfaces 86, which engage the base 27 of the upper groove 22 in the block; and any downward force that is exerted upon the pedal with the crank depending, as shown in Fig. 1, is taken by the flanges 40, 41. Also, the inward extension 52, which serves as a keeper for engaging the latching plunger 53, has an upper plane surface 87 (Fig. 2) engaging the bottom of the block for receiving downward thrusts exerted by the crank on the block when the crank extends upward, relieving strains on the pivot pin 30.

When it is desired to fold the cranks, the operator may lift upward on the handle end 76 of the actuating lever 64, in Fig. 3, causing the plunger 53 to move upward and causing its flat retaining surface 58 to be withdrawn from engagement with the walls of the groove 56 in the crank extension 52. In other words, a lifting movement on the handle end of the lever 64 unlatches the plunger 53 from the crank 12.

The spring 79 immediately acts to move the crank from the downwardly vertical position of Fig. 2 to the upwardly vertical position in regard to the shaft. The other crank is folded in the opposite direction, in the same way.

Referring to Figs. 6 to 9, this is a modified form of construction, which is provided with a crank 90 and a block 91. The block 91 may be secured upon its crank shaft in exactly the same manner previously described with respect to block 16, and crank 90 may be secured in the same way to block 91. The block 91 may be of similar construction to that previously described, so that the crank 90 is pivoted on the pin 30.

At its lower end the block 91 is provided on each of its sides with an inwardly extending slot 92, which is preferably rectangular in cross section. Each slot 92 is inserted by an upwardly extending bore 93 for receiving a pivot pin 94. The pivot pins 94 may be retained in their space in the bores 93 by a spring wire 95, which extends across the bottom of the block 91 and is upwardly curved at 96 adjacent each end.

The diagonally extending portions 97 of this wire 95 extend into the bores 93, and the extreme ends of the wire 95 extend into the apertures 98. The wire 95 is sufficiently resilient so that it may be bowed to be removed from the position of Fig. 8; but when it is in the position of Fig. 8, the wire 95 engages the pins 94 to hold them in place.

Each of the pins 94 supports a latching member 99, and the latching members may be identical in shape, but are oppositely disposed. The latching members 99 each have bores 100 for receiving the pins 94, and the latching members 99 are flat metal members projecting from the grooves 92 sufficiently so that they can be grasped with the fingers.

Thus, the portion 101 of each latching member serves as a handle to be grasped between the thumb and the forefinger. At its outer end, that is, the left, in Figs. 6 and 9, each latching member 99 is provided with a hook portion 102, having a plane shoulder 103 serving to engage another plane shoulder 104 on the crank 90.

In order to provide space for these hook portions 102, crank 90 is provided with a recess 108. The latching members 99 may also be inwardly curved at 109 on their outer edges, and surface 109 may be knurled so that the thumb engages this surface to retract the latching members from engagement with the crank 90. The latching members 99 are urged into latching position by a spring 105, having a partially circular portion 106 that extends about the tubular extension 18 of the block 91. The spring 105 is curved outwardly at 107 and downwardly at 110, the downwardly extending portion 110 being located in a groove 111 in each latching member 99. At its extreme lower end the spring 105 has its ends outwardly turned at 112 so as to aid in retaining the spring in place.

The spring 105 urges the right ends of the latching members in Fig. 9 apart, thus urging the hook portions 102 toward each other or into latching position.

The operation of this embodiment of the invention is similar to that previously described except that a different form of latch is employed. When the crank 90 is moved downward to the operative position of Fig. 6, the flat surface 85 on the crank engages the beveled surfaces 113 on each latch 99 and forces the latches apart until the crank reaches the position of Fig. 9, when the latches snap into latching position.

This modified construction has all of the advantages of that previously described, and strains are taken directly by the block and crank without placing undue strain upon the pivot pin or latch.

It will thus be observed that I have invented an improved folding crank which is simple in its construction and, therefore, capable of economical manufacture and sale at a low price so that it may be supplied to a vast number of users.

The present crank construction is adapted to be moved into operative position, where it is secured automatically, or it is adapted to be quickly released and moved into folded position, in which case the folding movement takes places automatically upon release of the latch.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a folding crank for bicycles, the combination of a supporting block adapted to be secured to a crank shaft of a bicycle, said supporting block having a pair of laterally projecting pivot flanges provided with a bore and having an axially extending groove on its outer face, with a crank arm, said crank arm being pivotally mounted upon a pin in said bore, and having its adjacent end portion formed to fit in said groove in said face, whereby the torque exerted upon said block by said crank arm is transmitted through the sides of said crank arm to the walls of said groove on said block, and latching means carried by said block for holding said crank arm in said groove, said latching means comprising a pair of latching members, one located on each side of said block, for engaging said crank arm, and common spring means for engaging both of said latching members to urge them into latching position.

2. In a folding crank for bicycles, the combination of a supporting block adapted to be secured to a crank shaft of a bicycle, said supporting block having a pair of laterally projecting pivot flanges provided with a bore and having an axially extending groove on its outer face, with a crank arm, said crank arm being pivotally mounted upon a pin in said bore, and having its adjacent end portion formed to fit in said groove in said face, whereby the torque exerted upon said block by said crank arm is transmitted through the sides of said crank arm to the walls of said groove on said block, and latching means carried by said block for holding said crank arm in said groove, said latching means comprising a pair of latching members, one located on each side of said block, for engaging said crank arm, and common spring means for engaging both of said latching members to urge them into latching position, each of said latching members being provided with a beveled camming surface adapted to engage the crank arm to force the latches aside when the crank arm is moved into latched position.

3. In a folding crank for bicycles, the combination of a supporting block adapted to be secured to a crank shaft of a bicycle, said supporting block having a pair of laterally projecting pivot flanges provided with a bore and having an axially extending groove on its outer face, with a crank arm, said crank arm being pivotally mounted upon a pin in said bore, and having its adjacent end portion formed to fit in said groove in said face, whereby the torque exerted upon said block by said crank arm is transmitted through the sides of said crank arm to the walls of said groove on said block, and latching means carried by said block for holding said crank arm in said groove, said latching means comprising a spring pressed plunger slidably mounted in a bore in the side of said block opposite to said pivot pin for engaging a shoulder carried by an axially projecting part on said crank arm.

4. In a folding crank for bicycles, the combination of a supporting block adapted to be secured to a crank shaft of a bicycle, said supporting block having a pair of laterally projecting pivot flanges provided with a bore and having an axially extending groove on its outer face, with a crank arm, said crank arm being pivotally mounted upon a pin in said bore, and having its adjacent end portion formed to fit in said groove in said face, whereby the torque exerted upon said block by said crank arm is transmitted through the sides of said crank arm to the walls of said groove on said block, and latching means carried by said block for holding said crank arm in said groove, said latching means comprising a spring pressed plunger slidably mounted in a bore in the side of said block opposite to said pivot pin for engaging a shoulder carried by an axially projecting part on said crank arm, and an actuating lever pivotally mounted on said block and engaging said plunger to keep the plunger from emerging from its bore when the crank arm is unlatched and to permit the unlatching of said plunger.

5. In a folding crank for bicycles, the combination of a supporting block adapted to be secured to a crank shaft of a bicycle, said supporting block having a pair of laterally projecting pivot flanges provided with a bore and having an axially extending groove on its outer face, with a crank arm, said crank arm being pivotally mounted upon a pin in said bore, and having its adjacent end portion formed to fit in said groove in said face, whereby the torque exerted upon said block by said crank arm is transmitted through the sides of said crank arm to the walls of said groove on said block, and latching means carried by said block for holding said crank arm in said groove, said latching means comprising a spring pressed plunger slidably mounted in a bore in the side of said block opposite to said pivot pin for engaging a shoulder carried by an axially projecting part on said crank arm, and an actuating lever pivotally mounted on said block and engaging said plunger to keep the plunger from emerging from its bore when the crank arm is unlatched and to permit the unlatching of said plunger, said plunger having a beveled camming surface on one of its sides for engagement with said axially projecting part of said crank arm to force the plunger backward when the crank arm is moved into latching position.

6. In a folding crank structure for bicycles, the combination of a metal block provided with a transverse bore adapted to receive the crank shaft of a bicycle, said block being provided at one end with a pair of integral parallel flanges, said flanges having aligned bores extending transversely to said first-mentioned bore, and said block being provided on its face with a pair of relatively thick integral flanges separated by a groove of rectangular cross section, with a pedal crank, said pedal crank being provided at its end with a pair of transversely extending pivot flanges adapted to be received between the first-mentioned flanges on said block, said pivot flanges also having bores aligned with the bores in the first-mentioned flanges, a transverse pin in said latter bores for pivoting said pedal crank on said block, said crank having an integral body portion of substantially rectangular cross section adapted to be received in the groove on the face of said block when said pivot flanges engage the base of the groove between said first-mentioned flanges, and latching means carried by a lower part of said block for holding said pedal crank in said grooves and in tight engagement with the bases of both of said grooves.

7. In a folding crank structure for bicycles, the combination of a metal block provided with a transverse bore adapted to receive the crank shaft of a bicycle, said block being provided at one end with a pair of integral parallel flanges, said flanges having aligned bores extending transversely to said first-mentioned bore, and said block being provided on its face with a pair of relatively thick integral flanges separated by a groove of rectangular cross section, with a pedal crank, said pedal crank being provided at its end with a pair of transversely extending pivot flanges adapted to be received between the first-mentioned flanges on said block, said pivot flanges also having bores aligned with the bores in the first-mentioned flanges, a transverse pin in said latter bores for pivoting said pedal crank on said block, said crank having an integral body portion of substantially rectangular cross section adapted to be received in the groove on the face of said block when said pivot flanges engage the base of the groove between said first-mentioned flanges, and latching means carried by a lower part of said block for holding said pedal crank in said grooves and in tight engagement with the bases of both of said grooves, said pin having a helical spring surrounding it and located between the pivot flanges of said pedal crank, said spring having outwardly projecting arms, one arm engaging said block, and the other arm engaging said pedal crank to urge the pedal crank out of the groove in the face of said block.

8. In a folding crank structure for bicycles, the combination of a metal block provided with a transverse bore adapted to receive the crank shaft of a bicycle, said block being provided at one end with a pair of integral parallel flanges, separated by a rectangular groove, said flanges having aligned bores extending transversely to said first-mentioned bore, and said block being provided on its face with a pair of integral flanges separated by a groove of rectangular cross section, with a pedal crank, said pedal crank being provided at its end with a pair of transversely extending pivot flanges adapted to be received between said parallel flanges on said block, said pivot flanges also having bores aligned with the bores in the parallel flanges, a transverse pin in said latter bores for pivoting said pedal crank on said block, said crank having an integral body portion of substantially rectangular cross section adapted to be received in the groove on the face of said block when said pivot flanges engage the base of the groove between said parallel flanges, and latching means carried by said block for holding said pedal crank in said grooves and in tight engagement with the bases of both of said grooves.

9. In a folding crank structure for bicycles, the combination of a metal block provided with a transverse bore adapted to receive the crank shaft of a bicycle, said block being provided at one end with a pair of integral parallel flanges separated by a rectangular groove, said flanges having aligned bores extending transversely to said first-mentioned bore, and said block being provided on its face with a pair of integral flanges separated by a groove of rectangular cross section, with a pedal crank, said pedal crank being provided at its end with a pair of transversely extending pivot flanges adapted to be received between said parallel flanges on said block, said pivot flanges also having bores aligned with the bores in the parallel flanges, a transverse pin in said latter bores for pivoting said pedal crank on said block, said crank having an integral body portion of substantially rectangular cross section adapted to be received in the groove on the face of said block when said pivot flanges engage the base of the groove between said parallel flanges, and latching means carried by said block for holding said pedal crank in said grooves and in tight engagement with the bases of both of said grooves, and resilient means for urging the crank from the latched position, whereby upon unlatching the crank is adapted to move into a position in which the pedal extends inwardly of the bicycle frame.

FRANK W. SCHWINN.